United States Patent Office 3,539,941
Patented Nov. 10, 1970

3,539,941
LIQUID LANTHANIDE CHELATE LUMINESCENT SYSTEM WITH SYNERGIC AGENT
Frederick Halverson, Stamford, Conn., assignor to American Cyanamid Company, Stamford, Conn., a corporation of Maine
No Drawing. Continuation-in-part of application Ser. No. 323,893, Nov. 15, 1963. This application Aug. 22, 1968, Ser. No. 754,714
Int. Cl. C09k *1/02;* F21k *2/00;* H01s *3/20*
U.S. Cl. 331—94.5                    10 Claims

ABSTRACT OF THE DISCLOSURE

A liquid luminescent system effective at room temperature (20° C. to 30° C.) using an inert solvent, contains a photoluminescent quantity (about $10^{-5}$ to $10^{-1}$ molar concentration) of a lanthanide chelate of a beta-diketone or a 2-hydroxy aromatic compound having a carbonyl group in the 1-position and at least about 1 mole per mole of chelate of a chelate complexing synergic agent from the group consisting of trialkyl group VA oxides, aryl group VA oxides, alkyl dialkyl phosphinates, dialkyl alkyl phosphonates, trialkyl phosphates, hexa-alkyl phosphoramide, and the corresponding thio analogs of each of the preceding, dialkyl sulfoxides, dialkyl sulfones, the alkyl groups all containing up to 18 carbon atoms and including halogenated (F, Cl) alkyls, and cyclic sulfoxides and sulfones with ring sizes from 3 to 10 carbon atoms. The lanthanide has an atomic number greater than 57. Particularly with a beta-diketone, the chelate gives useful stimulated emission, or laser action, in a resonant optical cavity, when pumped with activating ultraviolet radiation.

CROSS REFERENCES TO RELATED APPLICATIONS

This application is a continuation-in-part of a copending application Ser. No. 323,893, filed Nov. 15, 1963, which was copending with and a continuation-in-part of application Ser. No. 299,193, filed Aug. 1, 1963, both now abandoned.

Another continuation-in-part of Ser. No. 323,893, filed as application Ser. No. 502,503, Oct. 22, 1965, issued as Pat. 3,377,292, Apr. 9, 1968, Synergized Lanthanide Chelate Photoluminescent Composition.

SUMMARY OF THE INVENTION

This invention relates to a liquid composition having exceptional photoluminescent characteristics, and an improved stimulated emission or laser system using this liquid composition in a resonant optical cavity.

Recently laser systems have come into prominence because of the great potential use that such systems can have in various fields of application such as thin metal welding, fine machining, range finding for aerial objects and even in medical technology for the spot attachment of the retina of the eye. Lasers involving gaseous and solid materials have been developed to a relatively greater extent than liquid lasers. Lasers involving a liquid active medium could have an important potential advantage in that measures can be taken to cool the active medium by circulation through a heat exchanger external to the laser assembly. Unfortunately, at the date of filing of applicant's parent application, Aug. 1, 1963, liquid lasers had been unsatisfactory because of the necessity for operation at very low temperatures (below −130° C.) with a high viscosity medium (thick sirup or plastic mass). This latter characteristic of the medium makes circulation of the liquid impractical. Even under the temperature and viscosity conditions described above, the lifetime of the excited metastable electronic state involved in laser action is not optimum. Increasing the temperature and lowering the viscosity in conventional systems result in an unfavorable decrease in lifetime of the upper electronic state responsible for laser action and in the quantum yield for luminescence, both of which decrease the efficiency of the laser process to the point of being inoperable or commercially impractical. Considerable effort is being made to find better liquid media that lend themselves to commercial application, but notwithstanding such efforts no satisfactory system was known heretofore which could be used commercially.

Excitation by radiation of certain chelates of certain lanthanides is disclosed in U.S. Pat. 3,225,307, Samuel I. Weissman, Dec. 21, 1965, Optical Maser Using a Liquid Rare-earth Chelate. No temperature of operation is disclosed.

Additional data is disclosed in F. Halverson, J. S. Brinen, and J. R. Leto, Photoluminescence of Lanthanide Complexes. II. Enhancement by an Insulating Sheath, Journal of Chemical Physics, 41, 157–163 (July 1964), and the same authors, Photoluminescence of Lanthanide Complexes. III. Synergic Agent Complexes Involving Extended Chromophores, Journal of Chemical Physics, 41, 2752–2760 (November 1964).

The active liquid material which can be used in liquid lasers is also useful as a photoluminescent material to produce pleasing light effects. The liquid photoluminescent material can be used in decorative panels, signs and the like. It can be circulated through transparent tubes, with an air lock between liquids with different luminescing colors, to produce interesting dynamic, eye-catching effects.

In accordance with the present invention, it has now been found that liquid photoluminescent systems, effective at room temperature, abbreviated as liquid luminescent systems, having improved lifetimes of the metastable electronic states involved in laser transitions, and improved quantum efficiencies, in a much lower viscosity range, and a variety of luminescent colors, consist of inert solvents having in solution lanthanide chelates, complexed with synergistic agents.

Compounds having the following structural formulae are useful constituents of the active liquid media:

I

wherein $R_1$ and $R_2$ are the same or different radicals selected from alkyl of 1–18 carbon atoms, halogenated alkyl of 1–18 carbon atoms (fluoride or chloride substituents), alkoxy, furyl, thienyl and aryl and alkaryl groups, e.g., phenyl or alkyl substituted phenyl where the alkyl group has 1 to 18 carbon atoms, and M is a lanthanide ion having an atomic number greater than 57, this chelate being used in combination with a synergic agent as defined hereinbelow; and (II)

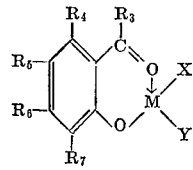

wherein X and Y may be the same or different radicals selected from a ligand of 2-hydroxy aromatic compounds (having a carbonyl group in the 1-position) as shown in Formula II or a hydroxyl, or an oxygen atom bridging two such M groups; and $R_3$ through $R_7$ may be the same or different groups selected from hydrogen, an alkyl group containing 1 to 18 carbon atoms, a fluorinated or chlorinated alkyl group containing 1 to 18 carbon atoms, an alkoxy group of up to 18 carbon atoms, and an aryloxy group, and M is a lanthanide ion having an atomic numzer great than 57, this chelate being used in combination with a synergic agent as described hereinbelow.

The symbol "/3" means that only one chelating group is shown, but that additional chelating groups are present to form a tris chelate.

For systems using the structural Formula I, the active liquid medium involves a lanthanide chelate of a beta diketone. The arrangement of the lanthanide ion in the chelate structure provides a conjugated unsaturated system which for the purpose of this invention is designated as a chromophore group. The organic moiety of the metal chelate is commonly referred to as a ligand in the chemical art. When the photons collide with the ligand it acquires a state of excitation known as the singlet state and then by a process of internal conversion and intersystem crossing, the ligand is converted to a condition whereby it is capable of exciting the rare earth metal into a metastable electronic state. In the metastable electronic state, the chelated lanthanide ion can emit a photon having an energy corresponding to a transition to a lower electronic level of the chelated ion. The photon thus emitted spontaneously can stimulate emission of like photons from other chelated metal ions in the same metastable state. When there are more chelated ions in the upper state of the electronic transition involved, than in the lower state, this stimulated emission process can give rise to "gain" in the number of like photons. If the cavity is resonant, only a few modes of electromagnetic radiation can achieve high gain whereby the photons in these modes act in unison to produce coherent monochromatic radiation, that is laser action. The longer the lifetime of the desired metastable electronic state of the metal ion and the higher the quantum efficiency, the less excitation power required to invert the populations of the electronic states for the laser transition. For the purpose of this invention, the term "lifetime" is used to mean the spontaneous lifetime of the luminescent metastable electronic state of the laser transition in the liquid active medium.

The optically resonant cavity in which the active liquid medium is contained may be of the Fabry-Perot type and may be designed to permit 0.1% transmission of the laser radiation from one end of the resonant cavity, or the percentage of transmitted radiation may be higher, namely, up to 15% or up to 30%. The resonant cavity may be composed of any material which is substantially transparent to the pumping radiation of the laser system while retaining structural integrity, and in this respect, the resonant cavity may comprise quartz, glass, sapphire, plastic, etc. The mirrors which are positioned at each end of the resonant cavity are designed to reflect the radiation having the wavelength of the photons of the radiative transition involving the metastable electronic state of the rare earth metal ion and may preferably, be transparent to radiation of other wavelengths. The materials serving as the coating for the formation of the mirror may be aluminum, silver, or other metals exhibiting high reflectivity at the laser wavelength, and including various materials suitable for forming dielectric mirrors, such as zinc sulfide, cryolite, calcium fluoride, magnesium fluoride, lithium fluoride, bismuth oxide, titanium dioxide, etc. The resonant cavity may be about 3 to 30 or more centimeters in length, and the diameter or cross section of the cavity occupied by the liquid medium will depend upon the optical transmission characteristics of the liquid medium. Generally in the case of cavities having a circular cross sectional area, the diameter is about 1 to 8 mm. For non-circular or circular cross sectional cavities, the distance of liquid medium through which the pumping radiation penetrates, preferably does not exceed about 6 mm.

As is apparent from the above description, an operating liquid phase laser has three essential parts, (1) an energy input device, which is the source of pumping radiation, (2) a resonant cavity, which in the Fabry-Perot configuration was described above, and (3) the active liquid medium, which fills the resonant cavity. An important advantage of the present invention is that the active medium exhibits longer lifetimes of the metastable fluorescent states involved in laser transitions and higher quantum efficiencies for luminescence at higher temperatures and lower viscosities than those previously known. The viscosities (as low as about two centipoise) are such as to allow ready circulation of the liquid at temperatures where laser action occurs.

As previously indicated, the active liquid medium contains as an essential part a lanthanide chelate of a beta diketone or of a 2-hydroxy aromatic ketone. Specific examples of the chelates of the beta diketone are those in which the rare earth metal ion may be europium, terbium, samarium, praesodymium, dysprosium, neodymium, gadolimium, erbium, etc. Specific examples of the chelates of beta diketones are terbium tris dipivaloylmethide, praesodymium tris trifluoroacetylacetonate, samarium tris hexafluoroacetylacetonate, dysprosium trisdipentafluoropanoylmethide, gadolinium tris dipivaloylmethide, erbium, tris diheptafluorobutyroylmethide, neodymium tris perfluoropentanoyl-2,3,-diethyl-5-furoylmethide, terbium tris perfluorooctanoyl-2,3-ditrifluoromethyl-5-furoylmethide, terbium tris tetrafluoroacetylacetonate, europium tris pentafluoropropanoyl-2-furoyl methide, terbium, tris hexafluoroacetylacetonate, terbium tris dipivaloylmethide, terbium tris pentafluoropropanol-2,3-difluoro-5-furoylmethide, samarium tris di(chlorodifluoroethanoyl) methide, gadolinium chelate of ethyl stearoylacetate, terbium chelate of butyl butyroylacetate, praesodymium chelate of ethyl-4,4-dimethyl-3-oxovalerate, etc. The same rare earth metals ions as mentioned above may be present in the chelate of the 2-hydroxy aromatic ketone. Specific examples are the europium chelate of 3,4,5-tetramethyl-2-hydroxy acetophenone, terbium chelate of 4,5-dimethyl-2-hydroxy acetophenone, terbium chelate of 1-(2-hydroxy-4,5-ditrifluoromethyl phenyl)-butanone-1, samarium chelate of 1-(2-hydroxy-3,4,5-triethylphenyl)-2,2,2-trifluoroethanone-1, praesodymium chelate of 1-(2-hydroxy-4, 5-dibutyl phenyl)-2,2,3,3,3-pentafluoropropanone-1, europium chelate of 1-(2-hydroxy-4,5-dimethylphenyl)-2,2,2-trifluoroethanone-1, erbium chelate of 1 - (2-hydroxy-4,5-dipropylphenyl)-pentanone-1, europium chelate of 1-(2-hydroxy-4,5,6-trimethyphenyl)-propanone-1, terbium chelate of 1-(2-hydroxy-4,5-dimethylphenyl)-2,2-difluoro-2-chloroethanone-1, praseodymium chelate of 1-(2-hydroxy-4,5-diisobutyl phenyl)-propanone-1, etc.

With respect to the compounds falling within the Formula I given hereinabove, they can be prepared by forming an aqueous solution of a water soluble salt of the rare earth metal. The water soluble rare earth metal salts can be the nitrates, sulfates, acetates, chlorides, bromides, etc. After the aqueous solution of the rare earth metal salt has been formed, the pH is adjusted to a range of about 3 to 8.5 by means of a buffer material. The buffers which can be used for this purpose include mixtures of ammonium or alkali metal acetate, -phosphate, -citrate, etc., with its corrospending conjugate acid. In the next step, the ligand of acetylacetone or a substituted acetylacetone is incorporated into a non-aqueous solvent or liquid such as a lower molecular alkanol containing about 1 to 5 carbon atoms, a lower molecular alkane having about 1 to 6 carbon atoms, a lower molecule chlorinated aliphatic hydrocarbon having about 1 to 5 carbon atoms, a cycloaliphatic, lower molecular aliphatic ethers having not more than about 6 carbon atoms, aromatic hydrocarbons, such as, for example, benzene, toluene, xylene, etc. Other specific examples of the non-aqueous solvent or liquid material include ethanol, diethyl ether, hexane, cyclohexane and chloroform. The non-aqueous liquid containing the ligand is then neutralized with a base or alkaline material, such as, for example, ammonium hydroxide, alkaline metal hydroxide, alkali metal carbonates and bicarbonates, substituted ammonia, such as, aliphatic amines, etc. Neutralization of the ligand by means of the base or alkaline material produces a soluble salt of acetylacetonate. The water soluble rare earth metal salt and the acetylacetonate are combined and the resultant mixture, if desired, is heated to a temperature of about 30 to 100° C. In some instances, the reaction between the water soluble rare earth metal salt and the acetylacetonate may be preferably conducted at a temperature below room temperature, namely, from about 0° C. to about room temperature or about 25° C. The time of reaction between rare earth metal salt and the acetylacetonate may be from about 1 minute to 1 hour. If two phases are present at the end of the reaction, the desired product is in the non-aqueous phase which is readily separated from the aqueous phase. The desired rare earth metal chelate of acetylacetonate can be purified by crystallization or other means readily known to those skilled in the art. For this purpose, the crystalline product material is dissolved in a suitable solvent, such as one of the non-aqueous solvent materials mentioned above, and then crystallized to form a product of enhanced purity. In some cases, the desired product upon being produced sublimes as an overhead vaporous material which can be condensed and cooled while the reaction is proceeding. As an alternative procedure, a rare earth metal oxide may be dissolved in nitric acid, hydrochloric acid, hydrobromic acid, acetic acid, etc., and the pH of the resultant solution adjusted to about 3 to 8.5 by means of the base or alkaline material previously described. The non-aqueous solvent or liquid material is then added to the salt solution of the rare earth metal and then a buffer of the type previously described is added thereto to bring the pH to within the desired neutral range. The acetylacetone or substituted acetylacetone, as such or in combination with a synergic agent is then added to the buffered solution. The remainder of the procedure can be the same as that described above.

With respect to the compounds falling within the Formula II above, a rare earth metal salt in the form of an acetate, chloride, bromide, nitrate, sulfate, etc., along with the ligand, which acts as a beta diketone, i.e. a 2-hydroxy aromatic ketone, even though the compound may be an ester, or aldehyde, and may herein be called either a 2-hydroxy aromatic ketone, for convenience; or more accurately a "2-hydroxy aromatic compound having a carbonyl group in the 1-position," are incorporated into a non-aqueous solvent or liquid material of the same type as described hereinabove in connection with the preparation of compounds falling within the Formula I. The resultant liquid mixture or solution is cooled to a temperature of about −20° C. to 0° C. Thereafter, anhydrous ammonia gas is passed through the liquid mass for a period of about 1 minute to 1 hour, while the temperature of the same is maintained at about −20° C. to 0° C. The desired product precipitates from the liquid mass and then it can be purified by recrystallization in a polar solvent, such as, for example, a lower molecular weight alkanol containing about 1 to 5 carbon atoms, a lower molecular aliphatic ether containing not more than about 6 carbon atoms, a lower molecular cyclic ether containing not more than about 6 carbon atoms, etc.

As an alternative procedure to the one given above in connection with the preparation of compounds falling within the definition of structural Formula II, an alkali metal bicarbonate or carbonate is employed in place of ammonia gas and the temperature of the reaction mass is maintained at about 30° C. to the boiling point of the solvent or liquid material. The desired product sublimes during the reaction and is collected in a suitable condenser as the reaction proceeds. The carbonate or bicarbonate of the alkali metal may be sodium carbonate, sodium bicarbonate, potassium carbonate, potassium bicarbonate, etc.

While the chelates themselves may exhibit photoluminescence, quite unexpectedly it has been discovered that the combination of the chelate with certain materials, termed synergic agents, effect significant improvements in quantum efficiency and lifetime of the emitting state. The synergic agents include a variety of classes of compounds; namely, the trialkyl group VA oxides, aryl group VA oxides, alkyl dialkyl phosphinates, dialkyl alkyl phosphonates, trialkyl phosphates, hexa-alkyl phosphoramide, and the corresponding thio analogs of each of the proceeding, dialkyl sulfoxides, dialkyl sulfones, the alkyl groups all containing up to 18 carbon atoms and including halogenated (F, Cl) alkyls, and cyclic sulfoxides and sulfones with ring sizes from 3 to 10 carbon atoms.

The trialkyl Group VA oxides may contain alkyl groups of about 1–18 carbon atoms, more usually about 5–12 carbon atoms, and the alkyl groups may also contain halogen in the form of fluorine or chlorine. The alkyl dialkyl phosphinates may contain alkyl groups of about 1–18 carbon atoms, more usually about 4–12 carbon atoms, and the alkyl groups may also contain fluorine or chlorine as substituents. The dialkyl alkyl phosphonates may contain alkyl groups of about 1–18 carbon atoms, more usually about 4–12 carbon atoms, and the alkyl groups may also contain fluorine or chlorine as substituents. The trialkyl phosphates may contain alkyl groups of about 1–18 carbon atoms, more usually about 3–12 carbon atoms, and the alkyl groups may also contain fluorine or chlorine as substituents. The alkyl sulfoxides and alkyl sulfones may contain alkyl groups of about 1–18 carbon atoms, more usually about 2–12 carbon atoms, and the alkyl groups may also contain halogen in the form of fluorine or chlorine. The cyclic sulfoxides and sulfones may be considered as derived from cycloalkanes by replacement of a methylene group by a sulfoxide or a sulfone grouping, and the ring size may vary from 3 to about 10 atoms. The aliphatic portion of the molecule may be halogenated (fluorinated or chlorinated). The aliphatic portion of a synergic agent may also have another synergic agent grouping as a substituent.

Specific examples of the synergic agents are tri(2-ethylhexyl) phosphine oxide, tri(2-chlorobutyl) phosphine oxide, tri-n-octyl phosphine oxide, tri amyl phosphine oxide, tri isobutyl phosphine oxide, butylethylmethylphosphine oxide, ethyl dibutyl phosphinate, hexyl dibutyl phosphinate, isopropyl diamyl phosphinate, butyl dibutyl phosphinate, dibutyl butyl phosphonate, diethyl trifluoromethyl phosphonate, dibutyl (2-chloroethyl) phosphonate, dibutyl cyclohexyl phosphonate, tributyl phosphate, tri octyl phosphate, tri isobutyl phosphate, tri(2-ethylhexyl) phosphate, hexaethyl phosphoramide, hexametyl phosphoramide, dimethylsulfoxide, ethyl propyl sulfoxide, diamylsulfoxide, dihexyl sulfoxide, dibutyl sulfone, di(2-ethylhexyl) sulfone, thiolane sulfoxide, tetrahydropyran sulfoxide, tetrahydropyran sulfone, bis(di-n-hexylphosphinyl) methide, triethylamine oxide, tributylarsine oxide, trihexylstibine oxide, tripropylbismuthine oxide, trimethyl stibine oxide, etc.

It also has been found that compounds which formally can be considered to be derived by combination of two or more of the synergic agent molecules described above are themselves synergic agents, provided they retain at least one oxygen grouping which functions as a relatively strong Lewis base. Examples are octaalkyl pyrophosphoramides, methylene bis(dialkyl phosphine oxides), ethylene bis(dialkyl phosphine oxides), and alkyl esters of pyrophosphoric acid.

The chelate and synergic agent combination comprising the active liquid medium can be produced in several ways. In a direct procedure the synergic agent, such as trialkyl phosphine oxide, alkyl dialkyl phosphinate, dialkyl alkyl phosphonate, trialkyl phosphate, alkyl sulfoxide, alkyl sulfone, hexaalkyl phosphoramide, cyclic sulfoxide cyclic sulfone, or a mixture thereof, is dissolved in an appropriate solvent, and this solution is combined with a solution or slurry of the lanthanide chelate, and the resulting mixture is allowed to stand up to two weeks at ambient temperature with agitation. Alternatively, the combination of synergic agent and lanthanide chelate may be obtained by combining an aqueous solution of the rare earth nitrate at an appropriate pH of about 1 to 7, with a hydrocarbon solution of the chelating ligand and the synergic agent, and shaking the mixture vigorously for 20 minutes to 1 hour. The aqueous phase is removed, and the hydrocarbon phase contains the lanthanide chelate-synergic agent complex.

The synergic agent is employed with the chelate in order to provide a shielding or insulating effect which is needed to minimize the radiationless loss of energy from the chelating chromophore-lanthanide ion system. The amount of synergic agent to be used for this purpose may vary considerably, however, for my purpose about one to 100 moles of the synergic agent per mole of lanthanide ion may be used, more usually, about two to eight moles of the synergic agent per mole of lanthanide ion is preferred.

Within a laser resonant cavity it is preferably desired that the chromophore-lanthanide ion units in the active medium be sufficiently spaced apart from each other, or their concentration be sufficiently dilute, that relatively uniform optical pumping of the medium can be achieved. Furthermore, the concentration density of the chromophore rare earth metal ion units in the active medium are preferably not so high as to produce undesirable interactions between them. On the other hand, the concentration must be high enough such that the "gain" due to stimulated emission more than compensates for the losses. Consequently, it is desirable to use a solvent along with the lanthanide chelate-synergic agent complex, in formulating the active liquid medium. The solvents which are useful for this purpose produce solutions having good optical clarity for radiation with wavelengths corresponding to both the luminescence of the metal chelate system and the exciting radiation. The solvent can be any material which is inert towards the chelate-synergic agent complex and in which the latter is soluble. Various classes of compounds may be suitable as solvents, namely, aliphatic hydrocarbons, halogenated aliphatic hydrocarbons, cycloparaffins, aliphatic ethers, cyclic ethers, silicone oils, higher alkanols, aliphatic esters, aliphatic nitriles, etc. The aliphatic hydrocarbons usable as solvents are those containing at least 5 carbon atoms and up to 15 carbon atoms. The halogenated hydrocarbons contain about 1–15 carbon atoms in the molecule. The cycloparaffins may have 5–12 carbon atoms and may be halogenated (fluorinated or chlorinated). The aliphatic ethers should be at least 5 carbon atoms, and may be halogenated (fluorinated or chlorinated). The cyclic ethers may be considered as derived from cycloalkanes by substitution of oxygen atoms for one or more methylene groups and may be halogenated (fluorinated or chlorinated). The silicone oils are alkyl polysiloxanes which are liquid in the desired temperature range of operation. The alkanols may have 4–12 carbon atoms, may be halogenated (fluorinated or chlorinated), and preferably do not have hydroxyl groups on adjacent or once removed carbon atoms. Specific examples of the solvents are hexane, isopentane, 2-ethylhexane, cyclohexane, methycyclohexane, cyclopentane, dioxane, butanol, methylene dichloride, dichloroethane, 1,2-dimethoxyethane (glyme), dimethyl ether of diethylene glycol (diglyme), "Florochemical FC 75" (fluorinated cyclic ether with empirical formula $C_8F_{16}O$), methyl polysiloxane, ethyl polysiloxane, ethyl acetate, acetonitrile, etc. The amount of solvent employed depends upon the concentration of chelated lanthanide ion which is desired in the active liquid medium. In general, it is desired that the chelated lanthanide ion concentration in the active liquid medium may be about $10^{-3}$ molar to $10^{-2}$ molar, although a wider range of about $10^{-4}$ molar to $10^{-1}$ molar may be used. For luminescent displays, concentrations of $10^{-4}$ to $10^{-5}$ give good results.

Heretofore, liquid lasers have been operable only at relatively low temperatures. Contrary to this method of operation, I have found that by virtue of the improvements effected in the liquid medium of the materials of the present invention, it is now possible to use substantially higher temperatures. Using the combination of synergic agent and rare earth metal chelates, luminescence, and even laser action is obtained at ambient temperature level (20° C to 30° C.) with relatively attractive quantum efficiencies.

The input energy to the active medium is in the form of optical radiation in the blue region of the visible spectrum and/or in the ultraviolet region of the spectrum This input radiation also is referred to as pump energy or pumping radiation or excitation radiation and the specific range of wavelengths employed is determined by the absorption bands of the active medium. A convenient source of pumping radiation is an electrical discharge in a gas filled quartz tube, where a variety of gas fillings may be used, such as xenon, argon, air, oxygen, mercury, and like substances. Or for that matter any high intensity electrical arc with radiation in the appropriate wavelength range can be used, such as a carbon or zirconium arc. The required power of pumping radiation may vary considerably depending on the volume of active medium to be excited, the lifetime of the fluorescent electronic state, and the quantum efficiency of luminescence.

One useful source of pumping radiation is that emitted by a xenon filled spiral quartz flashtube through which 100 to 10,000 joules of electrical energy are discharged in 0.1 to 4 milliseconds, with the resonant cavity located on the axis of the spiral. Generally, the pumping radiation may have a wavelength varying from about 200 millimicrons to about 450 millimicrons.

Having provided a description of the present invention, reference is now had to an example of a liquid laser system in order to provide a better understanding of the use of the present invention.

The optical resonant cavity consists of a clear quartz tube 6 mm. O.D., 1.0 mm. I.D., and 200 mm. long, with the ends ground flat and parallel to each other. The ends are closed with clear quartz pieces, the inner faces being ground and polished optically flat, and the outer faces being ground and polished in a convex shape with a radius of curvature of 250 mm. Thus each end piece has a plano-convex shape. The convex surface is coated with zinc sulfide and cryolite to form a multilayer dielectric mirror having maximum reflectivity (about 99.5%) in the region around 613 millimicrons. These plano-convex mirrors are positioned at the ends of the aforementioned quartz tube so as to form a confocal arrangement with the center of the tube as the optic axis, and are sealed in place with a standard epoxy cement. There is a side arm on the quartz tube to facilitate filling. A solution consisting of 0.09 gms. of material with the composition europium (hexafluoroacetylacetonate)$_3$ - (trioctylphosphine oxide)$_2$ dissolved in 10 ml. of dry methylcyclohexane at 25° C., is placed in the side arm of the resonant cavity. The side arm then is closed off from the atmosphere, and is connected to a vacuum system by means of a stopcock so that the resonant cavity can be evacuated or not as desired. The solution is cooled by immersion in liquid nitrogen, the side arm is evacuated, and evacuation is stopped. The solution is allowed to warm up to room temperature under its own vapor pressure. Then the solution is cooled again by immersion in liquid nitrogen, the side arm is evacuated again, evacuation is stopped, and the solution is allowed to warm up to room temperature under its own vapor pressure. The resonant cavity is filled with the active medium simply by tilting the side arm and allowing the liquid to flow into the cavity under the force of gravity. The resonant cavity, filled with the active medium, then is inserted in the interior of a tube which provides for absorption of visible and near infrared radiation which approaches the resonant cavity along the radial direction, but which transmits ultraviolet radiation freely. This optical filter may take the form of two concentric quartz tubes with the annular space filled with an aqueous cobalt sulfate solution, or it may simply be a tube of Corning CS 7-54 glass. This type of filter arrangement does not interfere with radiation emitted from the end of the resonant cavity.

This entire filter and resonant cavity assembly then is mounted parallel to a straight xenon filled quartz flashtube inside a cylindrical tube aluminized on the interior surface to provide improved reflectance of ultraviolet radiation. Dry nitrogen cooled to +20° C. is circulated around the resonant cavity until a constant temperature of resonant cavity and active medium is attained (about 15 minutes). A 125 microfarad energy storage capacitor charged to about 6000 volts is discharged through the xenon flashlamp, and the stimulated emission emerges from the end of the resonant cavity.

Useful ornamentation luminescent dynamic displays can be obtained by using a different form of cavity for the active liquid media. Beautiful luminescent color displays are obtained when cavity configuration and system parameters are such that spontaneous emission is responsible for the bulk of the luminescence. This does not require an optically resonant cavity or high pumping intensity associated with stimulated emission. But here also, practical operation is dependent on good quantum efficiencies for excitation of luminescence. One such dynamic display is described in detail in order to provide additional understanding of the use of the present invention.

One millimeter inside diameter ultraviolet and visible transmitting tubing, such as Vycor glass tubing, is shaped into the script form of the slogan "Smile," with one end of the tubing projecting from the letter S and the other end from the letter e. The dot above the letter i is simulated by placing a piece of black tape around the tubing just below the tip of the vertical section. This rigid piece of tubing hereinafter will be referred to as the "shaped tubing.' After shaping, the interior is rinsed out with a benzene solution of a silicon ester and then dried. It is mounted on a flat piece of plywood covered with black velvet, with the tubing ends protruding through the plywood to the back side. These projecting pieces on the back side are bent upwards so that they form vertical legs. The length of these vertical legs is about 4 times the maximum height of the tallest letter in the shaped tubing. The velvet covered plywood is surrounded on the front side by a projecting frame which shadows the shaped tubing from direct ambient illumination. An ultraviolet emitting lamp, such as Westinghouse FS-20 Sunlamp, is mounted inside the frame along the lower edge such that it illuminates the shaped tubing, but is not normally visible itself to persons looking at the shaped tubing. A visible absorbing ultraviolet transmitting filter, such as Corning CS 7-54, is inserted between the lamp and the shaped tubing.

On the back side each vertical tubing leg is connected to its own glass container by a piece of flexible tubing, such as polyethylene tubing. The two glass containers are mounted at opposite ends of a bar, with a pivot in the middle, such that when one container is low the other is high, and with the magnitude of this up and down motion restricted by stops. This motion of the bar about its pivot is controlled by an electrically actuated solenoid.

One glass container has a $10^{-2}$ M solution of terbium tris dipivaloylmethide in $3 \times 10^{-2}$ M trioctylphosphine oxide in methylcyclohexane added to it, the volume adjusted so that when it is in the up position there is more than enough liquid to fill the connecting tubing and the shaped tubing, including the vertical leg at the opposite end. This container then is positioned so that the liquid level in the opposite vertical leg is down about one-eighth inch from the top, and mercury then is added to the top of this leg, forming a plug 1 mm. in diameter and about 4 mm. long. Then a $5 \times 10^{-3}$ M solution of europium tris thenoyltrifluoroacetonate in $1.5 \times 10^{-2}$ M trioctylphosphine oxide in methylcyclohexane is added to the other container, and the flexible tube connecting it to the formed tube is vented briefly to allow trapped air to escape, thus permitting the second solution to contact the mercury plug (on the side opposite the first solution). Positioning of the arm supporting the glass containers is adjusted so that when one container is up the mercury plug moves up the opposite leg, and vice versa.

A standard proximity detector, sensitive to the presence of the mercury plug, is mounted halfway up each of the vertical tube legs of the shaped tubing behind the plywood. When one of these detectors senses the presence of the mercury plug, it emits an electrical signal which actuates the solenoid controlling the lever arm holding the two containers, causing the relative heights of the two containers to reverse. Hence the mercury plug is forced to move back and forth from one vertical leg of the shaped tubing to the other due to the hydrostatic pressure on it. The motion of the bar holding the solutions is adjusted to provide a relatively slow, smooth motion of the mercury plug.

When radiation from the ultraviolet lamp falls on the terbium solution, it emits a sharp green luminescence band at 5430 A. When ultraviolet radiation falls on the europium solution, it emits a pleasing orange-red luminescence at 6130 A. Hence observation of the shaped tube from the front gives the impression of one color being erased by another, with the slogan being written in a new color, as the small, relatively invisible, mercury plug moves back and forth through the shaped tube. Motion, coupled with a distinct change in color, catches the eye.

In order to provide a measure of the relative effectiveness of various lanthanide metal chelates, with and without synergic agents, as photoluminescent materials which can be used in active liquid media, a series of experiments was performed in which the lifetime of the luminescent electronic state and relative efficiencies for luminescence were evaluated. The technique involved placing a solution of the substance under investigation in a cylindrical quartz cell about 12 mm. in diameter and 150 mm. long, and exciting it with a pulse of radiation from an air filled, high intensity quartz flashtube. The energy input to the flashtube was 1250 joules, the flash duration was about 50 microseconds, and the radiation passed through a Corning 7–54 filter before entering the quartz cell with the liquid under investigation. The luminescence emitted by the solution was focussed on the entrance slit of a Perkin-Elmer monochromator, and the transient radiation at the exit slit was monitored by a Dumont 6292 photomultiplier tube. The output of the photomultiplier tube was amplified and displayed on a Tektronix oscilloscope. Since the output of the flashtube is continuous in wavelength over the range transmitted by the Corning 7–54 filter, and since the intensity is relatively reproducible from one flash to another, a comparison of the amplification necessary to obtain the same maximum signal on the oscilloscope for solutions with similar absorption characteristics and the same metal ion provides a measure of their relative luminescence efficiencies.

Since the exciting radiation did not last more than 100 microseconds, the luminescence which was emitted subsequently represented simple decay of chelated rare earth metal ions in their luminescent state. Since the signal observed in the oscilloscope is directly proportional to the instantaneous concentration of chelated ions in the luminescent state, the transient signal can be analyzed to determine the mean lifetime $\tau$, of the luminescent state. The natural logarithm of the oscilloscope signal, R was plotted as a function of time. The curve thus obtained was essentially a straight line for times greater than 100–150 microseconds (subsequent to disappearance of exciting radiation). The lifetime is given by the negative value of the reciprocal of the mean slope of this straight portion of the curve, $$\tau = \frac{1}{\frac{d \ln R}{dt}}$$

where $t$ is the time and the slope is obtained at times greater than 100–150 microseconds from the start of the exciting flash of radiation. In Table I below, the results obtained from various experiments on europium chelates with and without synergic agents are reported. The luminescence monitored was a narrow wavelength band at 613 millimicrons. The relative luminescence efficiencies are given in terms of the luminescence of europium tris dipivaloylmethide, assigning it arbitrarily the value unity in an alcohol solution (3:1 ethanol-methanol mixture). The simple tris chelates are soluble in alcohol but not in hydrocarbons. Attempts to prepare methylcyclohexane solutions resulted in mixtures which appeared to be colloidal suspensions rather than true solutions. The synergic agent complexes, however, were very soluble in methylcyclohexane or in benzene at 25° C.

TABLE I

| Run No. | Temp., °C. | Synergic agent | $R_1$[1] | $R_2$[1] | Life, microsec. Alcohol[2] | Life, microsec. Hydro.[3] | Relative luminescence efficiency |
|---|---|---|---|---|---|---|---|
| 1 | 25 | | $CH_3$ | $CH_3$ | 226 | 267 | 0.05 |
| 2 | 25 | | $C(CH_3)_3$ | $C(CH_3)_3$ | 335 | 326 | 1 |
| 3 | 25 | | $CH_3$ | phenyl | 162 | 263 | 5 |
| 4 | −20 | | $CH_3$ | phenyl | 396 | | 12 |
| 5 | −80 | | $CH_3$ | phenyl | 427 | | 28 |
| 6 | −139 | | $CH_3$ | pnehyl | 455 | | 30 |
| 7 | 25 | | $CF_3$ | $CH_3$ | 435 | | 13 |
| 8 | 25 | TOPO[4] | $CF_3$ | $CH_3$ | | 746 | [5] >26 |
| 9 | 25 | TBP[6] | $CF_3$ | $CH_3$ | | 745 | [5] >19 |
| 10 | 25 | | $CF_3$ | $CF_3$ | 430 | | 16 |
| 11 | 25 | TOPO[7] | $CF_3$ | $CF_3$ | | 791 | [5] >80 |
| 12 | 25 | | $CF_3$ | $CF_3$ | [8] 417 | | |
| 13 | 25 | DMSO[9] | $CF_3$ | $CF_3$ | [8] 565 | | |
| 14 | 25 | | phenyl | phenyl | ~60 | 142 | 7 |
| 15 | 25 | TOPO[10] | phenyl | phenyl | | 318 | [5] >14 |
| 16 | 25 | | $CF_3$ | thienyl | 371 | | ~19 |
| 17 | 25 | TOPO[4] | $CF_3$ | thienyl | | 704 | [5] ~80 |

[1] In the foregoing table, the column headings designated as $R_1$ and $R_2$ represent the substituents of the chelate shown in Formula I given hereinabove.
[2] 3:1 volumetric ratio of ethanol to methanol.
[3] Methylcylcohexane.
[4] Present as trioctylphosphine oxide in twice the molar amount of chelate.
[5] Luminescence efficiencies in hydrocarbon solvent.
[6] Present as tributyl phosphate in twice the molar amount of chelate.
[7] Present as trioctylphosphine oxide in about three times the molar amount of chelate.
[8] Lifetime in tetrahydrofuran solution.
[9] Present as dimethyl sulfoxide in about forty times the molar amount of chelate.
[10] Present as trioctylphosphine oxide in about fifteen times the molar amount of chelate.

Additional somewhat more absolute data on luminescence efficiency, namely the quantum efficiency for photoluminescence, for typical solutions of betadiketone chelates are given in Table II. All data refer to 25° C. Five common solvents are selected, and solutions are about $10^{-3}$ molar with respect to the lanthanide chelate, except for Run No. 24 which represents the pure liquid.

TABLE II

| Run No. | Synergic agent | $R_1$[1] | $R_2$[1] | M[2] | Solvent[3] | Φ[4] |
|---|---|---|---|---|---|---|
| 1 | | C(CH$_3$)$_3$ | C(CH$_3$)$_3$ | Eu | A | <0.003 |
| 2 | TOPO[5] | C(CH$_3$)$_3$ | C(CH$_3$)$_3$ | Eu | B | 0.028 |
| 3 | | C(CH$_3$)$_3$ | C(CH$_3$)$_3$ | Dy | A | <0.01 |
| 4 | TOPO[5] | C(CH$_3$)$_3$ | C(CH$_3$)$_3$ | Dy | C | 0.08 |
| 5 | TOPO[5] | C(CH$_3$)$_3$ | C(CH$_3$)$_3$ | Tb | B | 0.11 |
| 6 | | CF$_3$ | CH$_3$ | Eu | A | 0.044 |
| 7 | DHSO[6] | CF$_3$ | CH$_3$ | Eu | B | 0.13 |
| 8 | TBP[7] | CF$_3$ | CH$_3$ | Eu | B | 0.18 |
| 9 | TOPO[5] | CF$_3$ | CH$_3$ | Eu | B | 0.43 |
| 10 | DPPO[8] | CF$_3$ | CH$_3$ | Eu | C | 0.17 |
| 11 | | CF$_3$ | CF$_3$ | Eu | A | 0.16 |
| 12 | POPO[9] | CF$_3$ | CF$_3$ | Eu | B | ~0.6 |
| 13 | TOPO[5] | CF$_3$ | CF$_3$ | Eu | B | 0.79 |
| 14 | TOPO[10] | CF$_3$ | CF$_3$ | Eu | D | 0.86 |
| 15 | | CF$_3$ | thienyl | Eu | A | 0.18 |
| 16 | TOPO[5] | CF$_3$ | thienyl | Eu | B | 0.68 |
| 17 | | CF$_3$ | thienyl | Sm | A | <0.003 |
| 18 | TOPO[5] | CF$_3$ | thienyl | Sm | B | 0.02 |
| 19 | | C$_2$F$_5$ | furyl | Eu | C | 0.014 |
| 20 | DMSO[11] | C$_2$F$_5$ | furyl | Eu | C | 0.44 |
| 21 | | C$_2$F$_5$ | furyl | Eu | D | 0.13 |
| 22 | DOPO[12] | C$_2$F$_5$ | furyl | Eu | D | 0.29 |
| 23 | TOPO[10] | C$_2$F$_5$ | furyl | Eu | E | 0.55 |
| 24 | TOPO[5] | CF$_3$ | CH$_3$ | Eu | K[13] | 0.3 |

[1] Column headings designated as $R_1$ and $R_2$ refer to the substituents of the chelate shown in Formula I given above.
[2] Column heading designated as M represents the lanthanide ion contained in the chelate structure shown in Formula I given above.
[3] Solvents used are abbreviated as follows: A=a mixture consisting of a 3:1 volumetric ratio of ethanol to methanol; B=methylcyclohexane; C=benzene; D=ethylacetate; E=carbon tetrachloride.
[4] Column heading designated as Φ represents the quantum efficiency for luminescence.
[5] Present as trioctylphosphine oxide in twice the molar amount of chelate.
[6] Present as dihexylsulfoxide in twice the molar amount of chelate.
[7] Present as tributylphosphate in twice the molar amount of chelate.
[8] Present as triphenylphosphine oxide in twice the molar amount of chelate.
[9] Present as methylene bis(di-n-hexyl phosphine oxide) in three times the molar amount of chelate.
[10] Present as trioctylphosphine oxide in four times the molar amount of chelate.
[11] Present as dimethyl sulfoxide in one hundred times the molar amount of chelate.
[12] Present as methylene bis(diethoxy phosphine oxide) in ten times the molar amount of chelate.
[13] No solvent present.

EXAMPLE 1

Europium oxide, Eu$_2$O$_3$, is dissolved in dilute nitric acid (alternatively hydrochloric acid can be used) and the pH of the resultant aqueous solution is adjusted to 8.1 by using ammonium hydroxide. An equal volume of ethanol is added to the aqueous solution and then it is buffered with a 1 molar solution of sodium acetate to give a pH of 7.5. To the foregoing buffered liquid mass is added a solution of thenoyltrifluoroacetone in ethanol. The total mass is heated to 40° C. and maintained at that level for a period of 5 minutes. A precipitate is formed which is the desired compound of tris-(thenoyltrifluoroacetylacetonato)-europium (III). During the precipitation of the desired chelate the pH of the solution was maintained by the periodic addition of sodium acetate buffer. The desired product was purified by recrystallization from an ethanol solution. The theoretical empirical analysis of the desired compound is carbon 35.35%, hydrogen 1.48%, sulfur 11.8% and europium 18.63%. By actual analysis the compound was found to contain carbon 35.79%, hydrogen 1.57%, sulfur 11.5% and europium 18.60%.

EXAMPLE 2

0.269 gram of dysprosium chloride are charged to 15 milliliters of water and the resultant solution is buffered with sodium acetate to provide a pH of 5.1. 0.462 gram of trifluoroacetylacetone are charged to 15 milliliters of an aqueous solution containing 60% of ethyl alcohol. 0.45 cc. of 7.3 molar ammonium hydroxide are added to the acetylacetone solution and then it is buffered by means of ammonium acetate to provide a pH of 5.0. The two solutions were combined. A precipitate formed which was isolated by means of filtration. The precipitated solids were recrystallized from a solution composed of 50% benzene and 50% chloroform. The desired product was tris-(trifluoroacetylacetonato)-dysporium (III).

EXAMPLE 3

0.692 gram of europium nitrate are charged to 10 milliliters of water. 1.20 grams of hexafluoroacetylacetone are charged to 15 milliliters of absolute diethyl ether, and 0.80 milliliter of 7.3 M ammonium hydroxide are added to the ether solution. The aqueous solution and the ether solution are shaken together for 20 minutes at 30° C. The ether phase was isolated and dried. The desired product was obtained from this ether solution by evaporating away the ether. The product was tris-(hexafluoroacetylacetonato)-europium (III).

EXAMPLE 4

0.226 gram of terbium nitrate are charged to 10 milliliters of water. 0.384 gram of 1-furyl-4,4,5,5,5-pentafluoro-1,3-pentanedione are charged to 10 milliliters of diethyl ether, and 0.21 milliliter of 7.3 M ammonium hydroxide are added to the ether solution. The two solutions are shaken together for 30 minutes. The desired product, tris(1 - furyl - 4,4-5,5,5-pentafluoro-1,3-pentanedionato)-terbium (III) was isolated from the ether phase as described in Example 2 above.

EXAMPLE 5

0.299 gram of samarium sulfate and 0.510 gram of orthohydroxyacetophenone are charged to 85 milliliters of absolute ethanol. This solution is cooled to 0° C. and is stirred continually while pure ammonia gas is bubbled through the solution for 20 minutes or until no further color change in the solution occurs. 100 milliliters of cold (0° C.) pentane is then added and the addition of ammonia is stopped. The reaction mass is then allowed to warm to room temperature (25° C.) and the desired product, tris-(o-hydroxyacetophenono) - samarium (III) precipitates out and is collected by filtration. The product is purified by recrystallization from benzene.

EXAMPLE 6

0.450 gram of europium nitrate is charged to 20 milliliters of an ethanolic solution containing 5% of water. This solution is buffered to a pH of 7.1 with an acetate buffer. 0.575 gram of dipivaloylmethane and 0.120 gram of sodium hydroxide are charged to 80 milliliters of absolute ethanol. This solution is added to the europium solution and the whole is stirred at 35° C. for 1 hour. The desired product, tri - (dipivaloylmethanato)europium (III) is obtained from this reaction mass by evaporating the liquid portion and distilling or subliming the product from the so-obtained residue.

EXAMPLE 7

0.218 gram of praseodymium nitrate is charged to 20 milliliters of water, and the solution buffered to a pH of 7.6 with an acetate buffer. 0.327 gram of 1,1,1,2,2-pentafluoroheptane(3,5)dione and 0.218 gram of di-normal hexylsulfoxide are charged to 30 milliliters of normal hexane and the two solutions are shaken together for 1 hour at 25° C. The desired product, tris-(pentafluoropentandionato)-bis(dihexylsulphoxide)-praseodymium (III), is isolated from the hexane phase by drying the hexane solution and removing the solvent by evaporation.

EXAMPLE 8

The desired product, tris - (hydroxydimethyl benzophenono)-europium (III) is obtained from 0.330 gram of europium acetate and 0.700 gram of 2-hydroxy-4,5-dimethyl benzophenone by following exactly the procedure of Example 5.

EXAMPLE 9

Two volumes of an aqueous solution of 0.025 molar europium nitrate at pH=6.2 were added to one volume of hexane solution of 0.10 molar trifluoromethylacetylacetone and 0.05 molar trioctylphosphine oxide. The mixture was shaken vigorously for about 30 minutes, the aqueous phase removed and the hexane solution allowed to evaporate. The europium trifluoromethylacetylacetonate-trioctylphosphine oxide complex separated out as a pale yellow oil exhibiting intense photoluminescence at 613 millimicrons. This oil was readily soluble in methylcyclohexane, and a solution about $10^{-4}$ molar in metal was prepared for the lifetime measurements.

EXAMPLE 10

The same procedure was followed as in the previous preparation of Example 9, except that the trioctylphosphine oxide was replaced by tributyl phosphate.

EXAMPLE 11

The same procedure was followed as in the preparation of Example 9, except that the trifluoromethyl-acetylacetone was replaced by thenoyltrifluoroacetone, and the pH of the europium nitrate solution was adjusted to about 5.

EXAMPLE 12

Sixty-one mg. of trioctylphosphine oxide were dissolved in 50 ml. of methylcyclohexane, and this solution was added to a slurry of 48 mg. of europium tris hexafluoroacetylacetonate in 50 ml. of methylcyclohexane. The resulting mixture was allowed to stand at ambient temperature for five days with intermittent shaking and a clear solution resulted. About half the methylcyclohexane solution was evaporated to reduce the volume of solution to 50 ml.

EXAMPLE 13

Four milligrams of europium tris dibenzoylmethide were dissolved in 100 ml. methylcyclohexane. To this solution 22 mg. of trioctylphosphine oxide were added, and the resulting mixture allowed to stand for three hours with agitation. Then methylcyclohexane was evaporated until the volume was reduced to 50 ml.

EXAMPLE 14

Six mg. of Eu (hexafluoroacetylacetonate)$_3$ were dissolved in 50 ml. of dry tetrahydrofuran, and 22 milligrams of dimethyl sulfoxide were added to the resulting solution. This mixture was allowed to stand for two hours with agitation.

EXAMPLE 15

Tris-(o-hydroxyacetophenono) - europium is prepared by the procedure in Example 5, except that samarium sulfate is replaced by europium sulfate. A $10^{-4}$ M solution of this tris chelate is prepared by dissolving 0.03 gram in 500 milliliters of toluene. The solution is separated into two 250 ml. portions. To one portion, 0.06 gram of trioctylphosphine oxide are added. When the two portions are both illuminated by the same ultraviolet source, the orange-red emission is clearly much more intense from the portion to which the synergic agent has been added.

I claim:
1. A liquid luminescent system comprising:
   an optical cavity,
   a source of activating radiation generating pumping radiation of a wavelength range of about 200 millimicrons to about 450 millimicrons, in radiation impinging relationship with said cavity, and so that luminescent radiation produced is utilized separately from any incident radiation of wavelength longer than about 450 millimicrons, and
   in said cavity a liquid luminescent composition, effective at room temperature consisting essentially of a solution in an inert solvent of at a concentration of about $10^{-5}$ to about $10^{-1}$ molar of least one complex of a synergic agent with at least one chelate of lanthanide ion in which the chelate is a lanthanide chelate selected from the group consisting of the following formulae:
   A tris chelate

I.

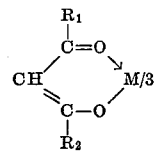

wherein $R_1$ and $R_2$ are each separately selected from alkyl containing 1–18 carbon atoms, halogen (F, Cl) containing alkyl of 1–18 carbon atoms, alkoxy of up to 18 carbon atoms, furyl, thienyl, alkyl substituted furyl, aryl and alkaryl, and M is a lanthanide selected from the group consisting of praseodymium, neodymium, samarium, europium, terbium, dysprosium, erbium, and gadolinium
and

II.

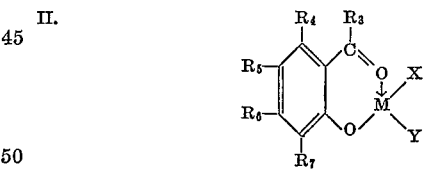

wherein X and Y are each selected from the 2-hydroxy aromatic compound having a carbonyl group in the 1-position ligand of Formula II, an oxygen atom bridging two M groups, and a hydroxyl, $R_3$–$R_7$ are each separately selected from hydrogen, alkyl of 1–18 carbon atoms, halogen (F, Cl) containing alkyl of 1–18 carbon atoms, alkoxy of up to 18 carbon atoms, and aryloxy groups, and M is a lanthanide defined as above
   and the synergic agent, present to the extent of at least about one mole per mole of said lanthanide, is selected from the group consisting of trialkyl group VA oxides, monocyclic aryl group VA oxides, alkyl dialkyl phosphinates, dialkyl alkyl phosphonates, trialkyl phosphates, hexa-alkyl phosphoramide, dialkyl sulfoxides, dialkyl sulfones, the alkyl groups all containing up to 18 carbon atoms and including halogenated (F, Cl) alkyls, and cyclic sulfoxides and sulfones with ring sizes from 3 to 10 carbon atoms.

2. The liquid luminescent system of claim 1 in which the source of pumping radiation is an electrical discharge in a gas filled tube.

3. The liquid luminescent system of claim 2 in which the optical cavity is resonant, and capable of stimulated emission.

4. The laser system of claim 3 in which the solvent in said liquid luminescent system is selected from the group consisting of liquid aliphatic hydrocarbon, halogen containing aliphatic hydrocarbon, cycloparaffin, aliphatic ester, aliphatic ether, cyclic ether, silicone oil and alkanol of at least four carbon atoms, and the lanthanide chelate is a tris chelate of Formula I.

5. The laser system of claim 4 wherein the liquid luminescent composition is at a temperature of about $-20°$ C. to $+25°$ C.

6. The laser system of claim 3 wherein the synergic agent is trialkyl phosphine oxide and the lanthanide chelate is of Formula I in which tris chelate $R_1$ and $R_2$ are each fluorine containing alkyl groups of 1–18 carbon atoms.

7. The laser system of claim 3 wherein the synergic agent is trialkyl phosphate and the lanthanide chelate is of Formula I in which tris chelate $R_1$ is fluorine containing alkyl 1–18 carbon atoms and $R_2$ is an alkyl of 1–18 carbon atoms.

8. The laser system of claim 3 wherein the synergic agent is dialkyl sulfoxide and the lanthanide chelate is of Formula I in which tris chelate $R_1$ and $R_2$ are each fluorine containing alkyl of 1–18 carbon atoms.

9. The laser system of claim 3 wherein the synergic agent is trialkyl phosphine oxide and the lanthanide chelate is of Formula I in which tris chelate $R_1$ and $R_2$ are each aryl groups.

10. The laser system of claim 3 wherein the synergic agent is trialkyl phosphine oxide and the lanthanide chelate is of Formula I in which tris chelate $R_1$ is fluorine containing alkyl of 1–18 carbon atoms and $R_2$ is a thienyl group.

References Cited

UNITED STATES PATENTS 3,225,307  12/1965  Weissman _____ 331—94.5

OTHER REFERENCES

Healy et al., J. Inorg. Nucl. Chem., 1962, vol. 24, pp. 1449, 1459–60.

Ferraro et al., J. Inorg. Nucl. Chem. 1962, vol. 24, pp. 1463–74.

TOBIAS E. LEVOW, Primary Examiner

A. P. DEMERS, Assistant Examiner

U.S. Cl. X.R.

250—71; 252—301.2; 260—429.2